(12) United States Patent
Jenzeh et al.

(10) Patent No.: US 10,616,421 B2
(45) Date of Patent: *Apr. 7, 2020

(54) GRAFTING AND SEPARATION OF MOBILE TELEPHONE NUMBER LINES

(71) Applicant: Verizon Patent and Licensing Inc., Arlington, VA (US)

(72) Inventors: Lisa Jenzeh, Wayland, MA (US); Elena Krimchansky, New City, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,970

(22) Filed: Aug. 22, 2018

(65) Prior Publication Data

US 2018/0367676 A1    Dec. 20, 2018

Related U.S. Application Data

(63) Continuation of application No. 15/591,564, filed on May 10, 2017, now Pat. No. 10,084,926.

(51) Int. Cl.
*H04M 15/00* (2006.01)
*H04W 4/24* (2018.01)
(Continued)

(52) U.S. Cl.
CPC ...... *H04M 15/771* (2013.01); *H04L 61/3075* (2013.01); *H04M 15/77* (2013.01); *H04W 4/12* (2013.01); *H04W 4/24* (2013.01); *H04W 8/18* (2013.01); *H04W 12/06* (2013.01); *H04W 28/24* (2013.01); *H04L 61/1588* (2013.01); *H04L 61/605* (2013.01); *H04L 61/6022* (2013.01); *H04L 61/6054* (2013.01); *H04W 4/50* (2018.02); *H04W 8/22* (2013.01)

(58) Field of Classification Search
CPC . H04M 15/771; H04M 15/77; H04L 61/3075; H04L 61/6022; H04L 61/6054; H04L 61/1588; H04L 61/605; H04W 28/24; H04W 4/24; H04W 4/50; H04W 8/22; H04W 12/06; H04W 8/18; H04W 4/12
USPC ..................................................... 455/414.1
See application file for complete search history.

(56) References Cited

U.S. PATENT DOCUMENTS 7,099,891 B2 *  8/2006  Harris ............... G06F 17/30569
                                                        707/754
9,185,221 B1 *  11/2015  Billnnan ............... H04M 3/523
(Continued)

*Primary Examiner* — Inder P Mehra

(57) ABSTRACT

A computer device may include a processor configured to execute instructions, stored in a memory, to receive a request to add a second mobile telephone number (MTN) line to a user equipment (UE) device associated with a first MTN line, generate a graft instruction to graft the second MTN line to the first MTN line, and send the generated graft instruction to a provisioning system configured to provision services for the UE device. The processor may be further configured to designate the second MTN line as having a grafted status with respect to the first MTN line, the grafted status indicating that the second MTN line has been added to a subscriber profile of the first MTN line, and that the UE device is configured to send and receive communications using the first MTN line and/or the second MTN line.

20 Claims, 9 Drawing Sheets

(51) Int. Cl.
*H04W 4/12* (2009.01)
*H04W 28/24* (2009.01)
*H04W 8/18* (2009.01)
*H04L 29/12* (2006.01)
*H04W 12/06* (2009.01)
*H04W 8/22* (2009.01)
*H04W 4/50* (2018.01)

(56) References Cited

U.S. PATENT DOCUMENTS

2005/0113062 A1* 5/2005 Pelaez .................. H04M 15/57
    455/405
2011/0207454 A1* 8/2011 Garg ................ H04M 3/42229
    455/432.1
2013/0295892 A1* 11/2013 Backhaus ............... H04W 4/16
    455/414.1
2014/0100549 A1* 4/2014 Bene .................. G06F 19/3481
    604/508

\* cited by examiner

GRAFTING AND SEPARATION OF MOBILE TELEPHONE NUMBER LINES

CROSS REFERENCE TO RELATED APPLICATIONS

This application is a continuation of U.S. patent application Ser. No. 15/591,564 filed on May 10, 2017, the contents of which are hereby incorporated herein by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices, resulting in various technological challenges. One example of such technological challenges includes managing multiple telephone numbers on a mobile communication device.

DETAILED DESCRIPTION OF PREFERRED EMBODIMENTS

Figure 1:
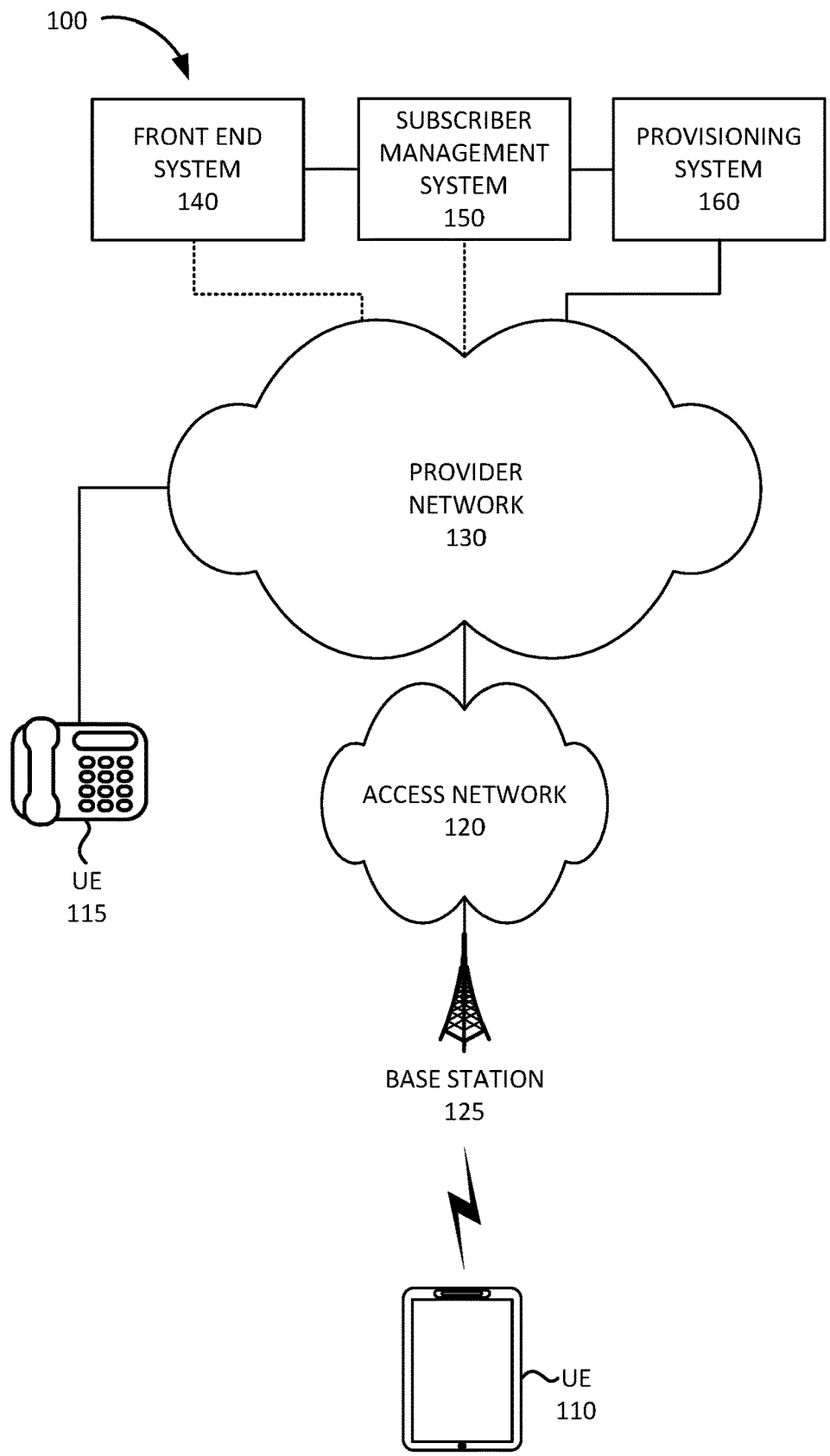
FIG. 1 is a diagram illustrating an environment according to an implementation described herein.

The following detailed description refers to the accompanying drawings. The same reference numbers in different drawings identify the same or similar elements.

Businesses often provide their employees with a mobile communication device or phone to use with a business telephone number to use in connection with their employment. An employee may use such a business mobile phone, for example, to receive telephone calls from customers or clients, to call a supervisor, and/or to communicate with other employees. A growing trend has been to allow employees to "bring your own device" (BYOD) and provisioning such a BYOD device for the services required by the business. For example, employees may use their own personal mobile phones as a BYOD device for their work. While such BYOD devices are beneficial for businesses, because they reduce costs for the business, the employee may be subject to additional fees for services required by the business and/or may be restricted from services when using the device for their personal use based on the provisioned services required by the business.

In order to mitigate such issues and improve customer experience, a provider of communication services may enable two mobile telephone numbers (MTNs), also referred to herein as "MTN lines," on a single user equipment (UE) device. For example, assume a business is a business customer of the service provider and an employee of the business is a consumer customer of the service provider. The employee may be able to retain a personal MTN, as well as associated services, on the employee's smart phone, while adding a business MTN, as well as associated services, which the employee may use for work. Configuring two MTNs on a single UE device may enable business customers to move away from the high cost of purchasing devices for their employees and may enable employees to use their own UE devices without incurring additional costs.

One solution to providing two MTN lines on a UE device is to provide two separate Subscriber Identity Module (SIM) cards on the device, with each MTN line being associated with its own SIM card. However, provisioning and maintaining two SIM cards on a UE device may increase cost and/or use of network resources, and may complicate UE device design, service provisioning, and/or customer experience. Thus, a preferable solution may include providing two MTN lines on a UE device with a single SIM card.

However, supporting two MTN lines on a UE device with a single SIM card may present challenges. For example, the two MTN lines may need to function independently, with each MTN line having its own billing account, service plan, and/or provisioning, while the association of the two MTN lines may need to be recorded and taken into consideration when either of the two MTN lines requires a service or account change. Furthermore, some types of service or account changes may be performed while the two MTN lines are associated with each other while the association between the two MTN lines may need to be removed before other types of service or account changes are performed.

Implementations described herein relate to "grafting" and "separation" of MTN lines. "Grafting," as the term is used herein, may refer to associating two MTN lines together in a subscriber management system and instructing a provisioning system to provision the two MTN lines on a single UE device. An existing MTN line associated with a UE device may be referred to as a "trunk" line and one or more MTN lines that are grafted to the trunk line associated with the UE device may be referred to as "branch" lines. A branch MTN line may be grafted to a trunk MTN line by adding the branch MTN line to the subscriber profile of the trunk MTN line and the UE device may be configured to send and receive telephone calls using the trunk MTN line and the branch MTN line. The subscriber profile may include a Home Subscriber Server (HSS) profile, an Internet Protocol (IP) Multimedia Subsystem (IMS) profile, and/or another type of profile associated with an MTN. Multiple branch MTN lines may be grafted onto a trunk MTN line.

"Separating," as the term is used herein, may refer to restoring one or more branch MTN lines and a trunk MTN line, which are grafted together, into independent states so that service or account changes may be performed on a particular MTN line without causing a disruption of service to other MTN lines. Once a service or account change is performed to a trunk MTN line, a branch MTN line, or both, the branch MTN line may be re-grafted to the trunk MTN line. Some types of service or account changes may require separation and other types of service or account changes may be performed while the MTN lines are in a grafted state.

A subscriber management system may be configured to receive a request to add a branch MTN line to a UE device associated with a trunk MTN line, determining that the branch MTN line is eligible to be grafted together with the trunk MTN line, generate a graft instruction to graft the branch MTN line to the trunk MTN line, send the generated graft instruction to a provisioning system configured to provision services for the UE device, and designate the branch MTN line as having a grafted status with respect to the trunk MTN line. In some implementations, generating the graft instruction may include generating an Extensible Markup Language (XML) document that includes the generated graft instruction. In other implementations, the graft instruction may include a different type of document or file.

Furthermore, information identifying the grafted status may be provided in response to requests for information relating to the trunk MTN line or the branch MTN line. For example, the subscriber management system may receive a request for information associated with the trunk MTN line or the branch MTN line from a front end system configured to process MTN service requests from users or customer representatives, and provide an indication of the grafted status to the front end system, in response to receiving the request for information associated with the trunk MTN line or the branch MTN line.

Determining that the branch MTN line is eligible to be grafted together with the trunk MTN line may include obtaining device information associated with the UE device, obtaining service requirements associated with the trunk MTN line, obtaining service requirements associated with the branch MTN line, and determining that the branch MTN line is eligible to be grafted together with the trunk MTN line based on comparing the obtained device information, the obtained service requirements associated with the trunk MTN line, and the obtained service requirements associated with the branch MTN line with one or more provider rules.

The provisioning system may, based on the generated graft instruction to graft the branch MTN line to the trunk MTN line, provision subscriber information management, provision an authentication platform, provision MTN routing, provision an application server, provision a messaging service, provision Access Point Name (APN), provision a software update, and/or perform another type of provisioning.

Moreover, the subscriber management system may perform separation and/or re-grafting of MTN lines. For example, the subscriber management system may receive a service update for at least one of the trunk MTN line or one or more branch MTN lines, determine that the service update requires separation of the grafted status of the branch MTN line with respect to the trunk MTN line, generate a separation instruction to separate the branch MTN line from the trunk MTN line, and send the generated separation instruction to the provisioning system. In some implementations, service updates requiring separation may include a disconnect request for the trunk MTN line or the branch MTN line, a suspend request for the trunk MTN line or the branch MTN line, and/or a request to change an MTN associated with the trunk MTN line or the branch MTN line. For example, a suspend request for the trunk MTN line may result in a provisioning that suspends the subscriber profile of the trunk MTN line and generates an updated or new subscriber profile for the branch MTN line. In other implementations, different types of service updates may require separation. Thus, for a situation with a trunk MTN line and one or more branch MTN lines, each MTN line may have service update request that is processed according to one or more provider rules.

At a later time, the subscriber management system may determine that the branch MTN line is eligible to be re-grafted together with the trunk MTN line, generating a re-graft instruction to re-graft the branch MTN line to the trunk MTN line, and send the generated re-graft instruction to the provisioning system.

FIG. 1 is a diagram of an exemplary environment 100 in which the systems and/or methods, described herein, may be implemented. As shown in FIG. 1, environment 100 may include a UE device 110, a UE device 115, an access network 120, a base station 125, a provider network 130, a front end system 140, a subscriber management system 150, and a provisioning system 160.

UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, messaging services (e.g., Short Message Service (SMS) messages, Multimedia Messaging Service (MMS) message, Instant Messaging (IM) messages, etc.), mobile broadband services (e.g., video streaming, real-time gaming, premium Internet access etc.), best effort data traffic, and/or other types of applications. UE device 110 may be associated with a user's personal MTN line referred to herein as a trunk MTN line.

UE device 115 may include any device configured for placing and/or receiving telephone calls. For example, UE device 115 may include a telephone terminal; a personal computer or workstation; a server device; a laptop, tablet, or another type of portable computer; a set-top box; a gaming system; a portable communication device (e.g., a mobile phone, a smart phone, a GPS device, and/or another type of wireless device); and/or any type of device with communication capability configured for making and receiving telephone calls. Additionally, UE device 115 may have additional capabilities similar to the capabilities of UE device 110 described above.

UE device 115 may be associated with user's business MTN line referred to herein as a branch MTN line. While a single UE device 115 is shown in FIG. 1 for illustrative purposes, a branch MTN line may be associated with multiple UE devices 115. Furthermore, the user may be associated with multiple branch MTN lines and each branch MTN line may be associated with one or more telephones 115.

Access network 120 may provide access to provider network 130 for wireless devices, such as UE device 110. Access network 120 may enable UE device 110 to connect to provider network 130 for mobile telephone service, SMS message service, MMS message service, IM messaging, Internet access, cloud computing, and/or other types of data services.

Access network 120 may establish a packet data network connection between UE device 110 and provider network 130 via one or more Access Point Names (APNs). For example, access network 120 may establish an Internet Protocol (IP) connection between UE device 110 and provider network 130 using a first APN and may establish a Session Initiation Protocol (SIP) connection to an Internet Multimedia Subsystem (IMS) using a second APN. In some implementations, access network 120 may include a Long Term Evolution (LTE) access network (e.g., an evolved packet core (EPC) network).

In other implementations, access network 120 may include an LTE Advanced (LTE-A) access network and/or any other advanced wireless network, such as a 5G access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; Machine-Type Communication (MTC) functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access network 120 may include a base station 125 and UE device 110 may wirelessly communicate with access network 120 via base station 125 when UE device 110 is located within the geographic area serviced by base station 125. Base station 125 may be part of an LTE eNodeB base station device. An eNodeB base station device may use the Evolved Universal Terrestrial Radio Access (E-UTRA) air interface to wirelessly communicate with devices. An eNodeB base station device may include one or more devices (e.g., base stations 125) and other components and functionality that allow UE device 110 to wirelessly connect to access network 120. The eNodeB base station device may include or be associated with one or more cells. For example, each cell may include a radio frequency (RF) transceiver facing a particular direction. The eNodeB base station device may correspond to a macrocell or to a small cell (e.g., a femtocell, a picocell, a microcell, etc.).

Provider network 130 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Provider network 130 may provide telephone and/or other types of voice communication services to UE device 115 and/or to UE device 110. Furthermore, provider network 130 may allow the delivery of Internet Protocol (IP) services to UE device 110, and may interface with other external networks. Provider network 130 may include one or more server devices and/or network devices, or other types of computation or communication devices. In some implementations, provider network 130 may include an Internet Protocol Multimedia Subsystem (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

Front end system 140 may include one or more devices, such as computer devices and/or server devices, which are configured to communicate with customers, customer representatives, and/or sales representatives. For example, front end system 140 may host a website that enables customers to log in, access information relating to a subscription, and/or request service or account changes for the subscription. Furthermore, front end system 140 may be configured to communicate with a point-of-sale (POS) terminal operated by a sales representative that enables the sales representative to obtain subscription information and/or request service or account changes for a subscription. Moreover, front end system 140 may be configured to provide a user interface to a customer representative that is communicating with a customer. The customer representative may use the user interface to obtain subscription information and/or request service or account changes for a subscription on the customer's behalf.

Front end system 140 may request subscription information associated with a particular MTN line from subscriber management system 150, may receive the requested subscription information, and may provide the received subscription information to the customer. The subscription information may include information identifying a grafted state for the particular MTN line (e.g., whether the particular MTN line is grafted to another MTN line or whether another MTN line is grafted to the particular MTN line). Front end system 140 may communicate with subscriber management system 150. In some implementations, front end system 140 may communicate with subscriber management system 150 via provider network 130 (shown as the dotted line in FIG. 1). In other implementation, front end system 140 may communicate with subscriber management system 150 via another network (not shown in FIG. 1). In yet other implementations, front end system 140 may communicate with subscriber management system 150 directly.

Subscriber management system 150 may include one or more devices, such as computer devices and/or server devices, which maintains and/or manages subscription information relating to MTN lines associated with customers. For example, subscriber management system 150 may store information relating to particular subscriptions associated with MTN lines and may perform changes to particular subscriptions based on requests received from front end system 140 and/or based on event triggers generated for particular subscriptions (e.g., a suspend order being generated based on a customer's unpaid balance). Furthermore, subscriber management system 150 may perform the functions of a billing system that tracks billing charges and generates invoices for subscriptions associated with MTN lines. Furthermore, subscriber management system 150 may generate graft instructions to graft a branch MTN line to a trunk MTN line, separate instructions to separate grafted MTN lines, and/or re-graft instructions to graft a branch MTN line to a trunk MTN line after separation. Subscriber management system 150 may communicate with provisioning system 160. In some implementations, subscriber management system 150 may communicate with provisioning system 160 via provider network 130 (shown as the dotted line in FIG. 1). In other implementation, subscriber management system 150 may communicate with provisioning system 160 via another network (not shown in FIG. 1). In yet other implementations, subscriber management system 150 may communicate with provisioning system 160 directly.

Provisioning system 160 may include one or more devices, such as computer devices and/or server devices, which provision services for MTN lines. For example, provisioning system 160 may execute a series of provisioning steps to enable a particular service for a particular MTN line on a particular UE device 110. The provisioning steps may include provisioning system 160 generating an instruction and sending the instruction to a particular network device (not shown in FIG. 1), such as a routing device (e.g., a router, a switch, a firewall, a getaway, etc.), a wireless access network device (e.g., a base station, a Mobility Management Entity (MME), a Serving Gateway (SGW), a Packet Data Network Gateway (PGW), a Home Subscriber Server (HSS), etc.), an IMS device (e.g., an Application Server (AS), a Call Session Control Function (CSCF) device, etc.), a messaging server (e.g., an SMS server, an MMS server, an IM server, a voicemail server, etc.), an authentication server (e.g., a Diameter server, an Authentication, Authorization, and Accounting (AAA) server), etc.), an update server (e.g., an Over-the-air (OTA) server), and/or another type of network device.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
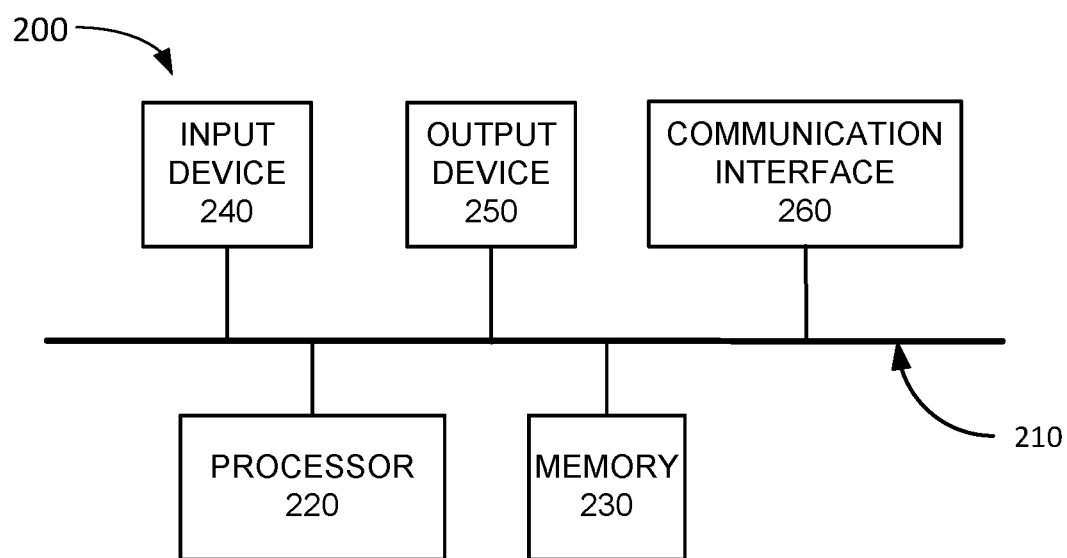
FIG. 2 is a diagram illustrating exemplary components of a device that may be included in a device of FIG. 1.

FIG. 2 is a diagram illustrating example components of a device 200 according to an implementation described herein. UE device 110, UE device 115, front end system 140, subscriber management system 150, and/or provisioning system 160 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to grafting and separating of MTN lines. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figures 3A, 3B:
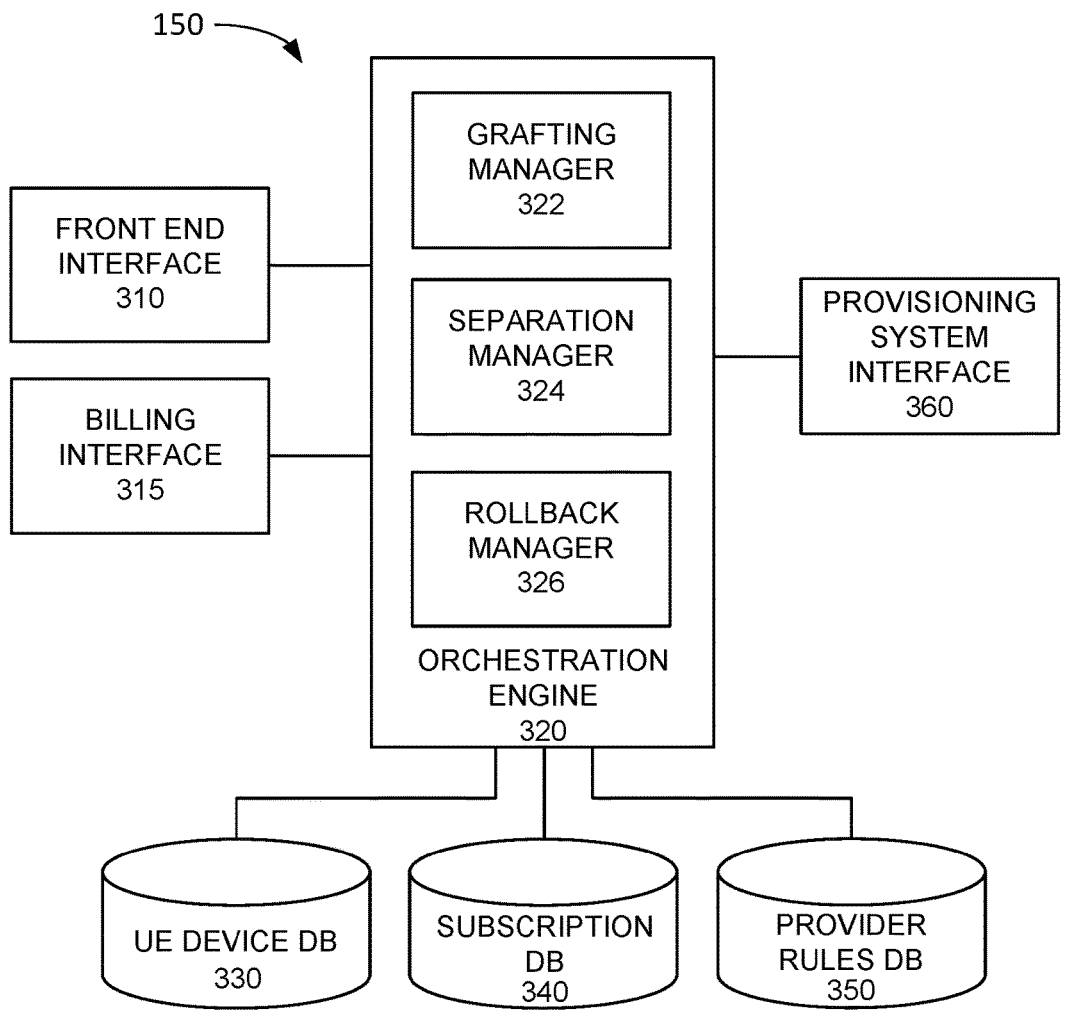
FIG. 3A is a diagram illustrating exemplary functional components of the subscriber management system of FIG. 1.
FIG. 3B is a diagram illustrating exemplary components of the subscriber database of FIG. 3A.

FIG. 3A is a diagram illustrating exemplary functional components of subscriber management system 150. The functional components of subscriber management system 150 may be implemented, for example, via processor 220 executing instructions from memory 230. Alternatively, some or all of the functional components included in subscriber management system 150 may be implemented via hard-wired circuitry. As shown in FIG. 3A, subscriber management system 150 may include a front end interface 310, a billing interface 315, an orchestration engine 320, a UE device database (DB) 330, a subscription DB 340, a provider rules DB 350, and a provisioning system interface 360.

Front end interface 310 may be configured to interface with front end system 140. For example, front end interface 310 may provide an Application Programming Interface (API) that enables front end system 140 to request subscription information from subscription DB 340 and/or to request subscription and account changes for a subscription associated with a particular MTN. For example, the front end interface API may enable front end system 140 to request to add a branch MTN line to a trunk MTN line (e.g., to add an MTN line associated with UE device 115 to UE device 110).

Billing interface 315 may interface with a billing component of subscriber management system 150 (not shown in FIG. 3A). Billing interface 315 may receive a request from the billing component to perform a particular service or account change for an MTN line. For an example, if an unpaid balance for a subscription associated with an MTN line exceeds a threshold, the billing component may request that the MTN line be suspended until the balance is paid. In response, orchestration engine 320 may select to perform a separation if the MTN line is in a grafted state with another MTN line before the MTN line is suspended.

Orchestration engine 320 may be configured to orchestrate grafting and separation of MTN lines. Orchestration engine 320 may include a grafting manager 322, a separation manager 324, and a rollback manager 326. Grafting manager 322 may graft a branch MTN line to a trunk MTN line. For example, grafting manager 322 may receive a request to add a branch MTN line to UE device 110 and may determine whether the branch MTN line may be added to UE device 110. For example, grafting manager 322 may determine whether the branch MTN line may be grafted to a trunk MTN line associated with UE device 110 based on information stored in UE device DB 330, subscription DB 340, and provider rules DB 350. If the branch MTN line is determined to be eligible to be grafted to the trunk MTN line associated with UE device 110, grafting manager 322 may generate a graft instruction for provisioning system 160.

Separation manager 324 may separate a branch MTN line from a trunk MTN line. For example, orchestration manager 320 may receive a request to perform a service or account change for an MTN line that is associated with a grafted status and may determine whether separation of the grafted status is required to perform the requested service or account change based on information stored in subscription DB 340. If separation manager 324 determines that separation is required, separation manager 324 may generate a separation instruction for provisioning system 160. The separation instruction may include an instruction to separate the branch MTN line and the trunk MTN line and an instruction to perform the requested service or account change after the separation is performed.

Rollback manager 326 may be configured to rollback the state of a branch MTN line and/or trunk MTN line to a previous state if a grafting or separation process fails, stalls, or generates an error. For example, provisioning system 160 may report a provisioning failure when grafting a branch MTN line to a trunk MTN line that may result in service disruption for the trunk MTN line. In response, provisioning system 160 may send an error message to subscriber management system 150 and rollback manager 326 may restore the previous state of the branch MTN line and the trunk MTN line. For example, rollback manager 326 may remove a grafted status for the branch MTN line and the trunk MTN line from subscription DB 340 and may instruct provisioning system 160 to reverse any provisioning steps that were taken in response to a generated graft instruction.

UE device DB 330 may store information relating to particular UE devices 110. For example, UE device DB 330 may store a UE device identifier (ID), such as an International Mobile Equipment Identity (IMEI) ID and/or another type of UE device ID; for UE device 110, make and model information for UE device 110; information identifying software installed on UE device 110, such as an operating system (OS) and/or one or more applications; and/or other types of information relating to UE device 110. The information stored in UE device DB 330 may be used by orchestration engine 320 to determine whether a particular branch MTN line eligible to be grafted to a trunk line associated with UE device 110. Subscription DB 340 may store subscription information relating to particular MTN lines. Exemplary information that may be stored in subscription DB 340 is described below with reference to FIG. 3B.

Provider rules DB 350 may store one or more provider rules associated with provider network 130. A particular provider rule may specify eligibility requirements for grafting a branch MTN line to a trunk MTN line. The eligibility requirements may specify a particular type of UE device 110 (e.g., a particular make and model, a particular software version, etc.) and/or a particular service requirement (e.g., a particular service plan, a particular enabled service, a particular account type, etc.) for a branch MTN line and/or trunk MTN line. Furthermore, a particular provider rule may specify a particular type of service or account transaction and whether separation is required to perform the particular service or account transaction. For example, in some implementations, service transactions that may require separation may include a disconnect request for the trunk MTN line or the branch MTN line, a suspend request for the trunk MTN line or the branch MTN line, and/or a request to change an MTN associated with the trunk MTN line or the branch MTN line.

Provisioning system interface 360 may be configured to communicate with provisioning system 160. For example, provisioning system interface 360 may be configured to send graft instructions and/or separation instructions to provisioning system 160. Furthermore, provisioning system interface 360 may receive an indication from provisioning system 160 as to whether a graft or separation transaction has been performed successfully or whether a provisioning error occurred while executing a provisioning process for a graft or separation transaction.

Although FIG. 3A shows exemplary components of subscriber management system 150, in other implementations, subscriber management system 150 may include fewer components, different components, additional components, or differently arranged components than depicted in FIG. 3A. Additionally or alternatively, one or more components of subscriber management system 150 may perform one or more tasks described as being performed by one or more other components of subscriber management system 150.

FIG. 3B is a diagram illustrating exemplary components of subscription DB 340. As shown in FIG. 3B, subscription DB 340 may include one or more subscription records 370. Each subscription record 370 may store information relating to a particular subscription. Subscription record 370 may include a subscription identifier (ID) field 372, an MTN field 374, a status field 376, a plan field 378, a user field 380, and a device field 382.

Subscription ID field 372 may store an ID associated with a particular subscription, such as an account number, a service plan number, and/or another type of ID. MTN field 374 may store a particular MTN associated with the particular subscription, such as a Mobile Station International Subscriber Directory Number (MSISDN), an International Mobile Subscriber Identity (IMSI) number, a Mobile Directory Number (MDN), a Session Initiation Protocol (SIP) address, and/or another type of telephone number.

Status field 376 may store a grafted status associated with the particular MTN. For example, status field 376 may store information identifying whether the particular MTN has not been previously grafted with another MTN, whether the particular MTN is grafted to another MTN, whether another MTN is grafted to the particular MTN, whether the particular MTN has been separated from another MTN with which the particular MTN has been grafted, and/or another type of status relating to grafting or separation of MTN lines.

Plan field 378 may store information identifying a particular subscription plan associated with the particular MTN. The service plan may identify, for example, a service level and/or service requirement for particular services, such as voice communication, video streaming, high priority data, best effort traffic, a connection to a particular APN (e.g., an APN associated with a private network), and/or another type of service. The service level and/or service requirement may specify one or more parameters, such as bandwidth, data throughput, latency, amount of allowed data, etc., for each enabled service.

User field 380 may identify a particular user associated with the particular MTN. Device field 382 may store information identifying a particular UE device 110 associated with the particular MTN, such as an IMEI, IP address, Media Access Control (MAC) address, Global Unique Temporary ID (GUTI), and/or another type of ID associated with UE device 110. Furthermore, user field 380 may store information identifying a type of device associated with UE device 110, such as a make, model, and/or version of UE device 110.

Although FIG. 3B shows exemplary components of subscription DB 340, in other implementations, subscription DB 340 may include fewer components, different components, additional components, differently arranged components, fewer fields, different fields, or additional fields, than depicted in FIG. 3B.

Figure 4:
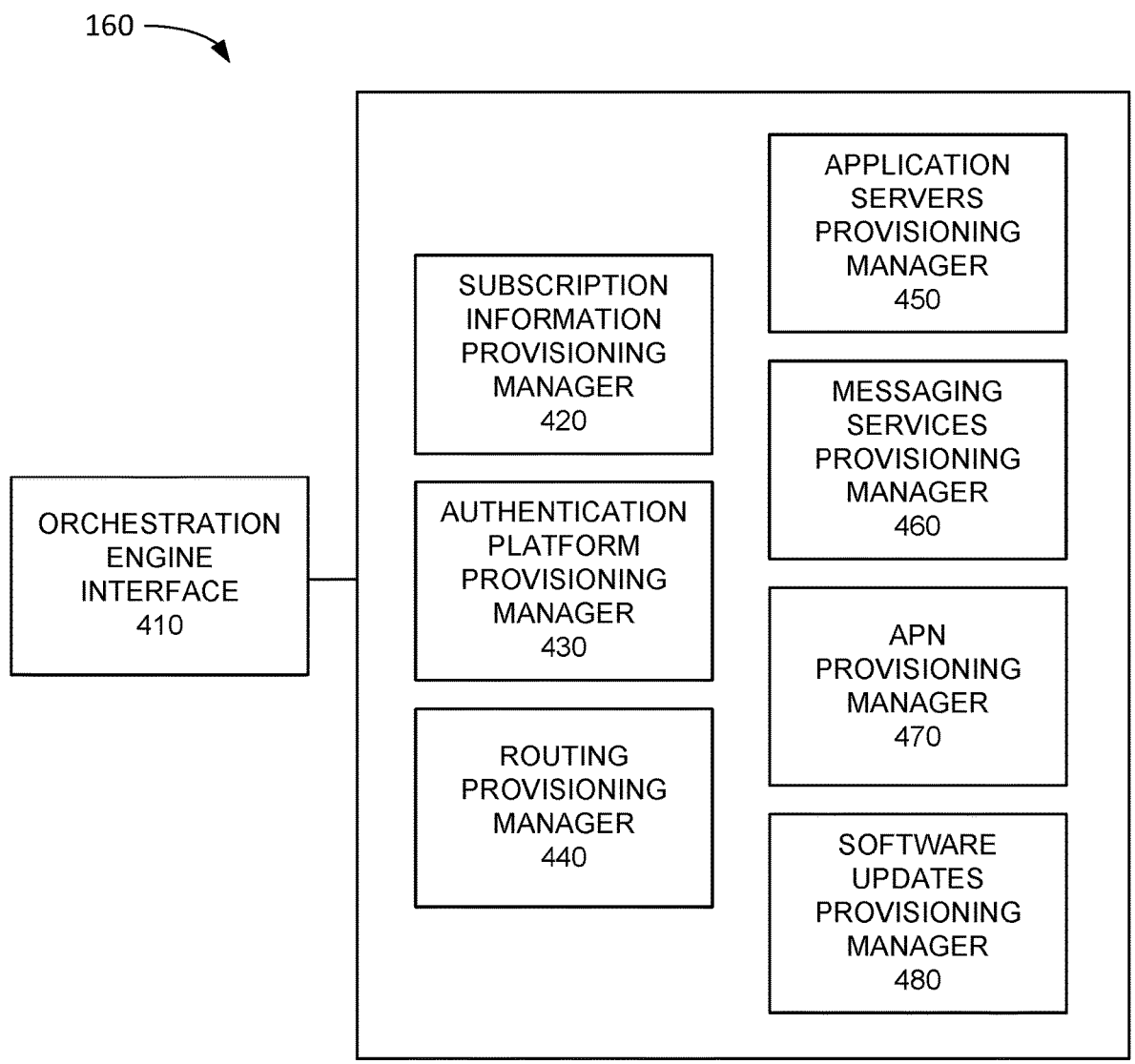
FIG. 4 is a diagram illustrating exemplary functional components of the provisioning system of FIG. 1.

FIG. 4 is a diagram illustrating exemplary functional components of provisioning system 160. The functional components of provisioning system 160 may be implemented, for example, via processor 220 executing instructions from memory 230. Alternatively, some or all of the functional components included in provisioning system 160 may be implemented via hard-wired circuitry. As shown in FIG. 4, provisioning system 160 may include an orchestration engine interface 410, a subscription information provisioning manager 420, an authentication platform provisioning manager 430, a routing provisioning manager 440, an application servers provisioning manager 450, a messaging services provisioning manager 460, an APN provisioning manager 470, and a software updates provisioning manager 480.

Orchestration engine interface 410 may be configured to communicate with subscriber management system 150. For example, orchestration engine interface 410 may provide an API to subscriber management system 150 that enables subscriber management system 150 to send graft instructions and/or separation instructions to provisioning system 160. In response, provisioning system 160 may perform one or more provisioning processes to carry out a grafting of a branch MTN line to a trunk MTN line or a separation of a branch MTN line from a trunk MTN line.

Subscription information provisioning manager 420 may provision subscription information. As an example, subscription information provisioning manager 420 may update a subscription record for a trunk MTN line to add a branch MTN line when grafting the branch MTN line to the trunk MTN line. As another example, subscription information provisioning manager 420 may remove the branch MTN line from the subscription record for the trunk MTN line when separating the branch MTN line from the trunk MTN line. Alternatively, in some situations (e.g., when a trunk MTN line is being suspended, disconnected, etc.), subscription information provisioning manager 420 may replace a subscription record for a trunk MTN line with a subscription record for a branch MTN line when separating the branch MTN line from the trunk MTN line. The subscription record may include an HSS subscriber record, an IMS subscriber record (e.g., an IMS Multimedia Telephone Application Server (MTAS) record, etc.), and/or another type of subscription record.

Authentication platform provisioning manager 430 may provision one or more authentication platforms. As an example, when grafting a branch MTN line to a trunk MTN line, authentication platform provisioning manager 430 may add the branch MTN line to an account associated with trunk MTN line in an authentication platform server, such as an AAA server. As another example, when separating a branch MTN line from a trunk MTN line, authentication platform provisioning manager 430 may remove a branch MTN line from an account associated with the trunk MTN line in an authentication platform server, or may replace an account associated with the trunk MTN line with an account associated with the branch MTN line.

Routing provisioning manager 440 may provision one or more routing devices. As an example, when grafting a branch MTN line to a trunk MTN line, routing provisioning manager 440 may instruct one or more routing devices, such as a Diameter Routing Agent (DRA) device, to route messages associated with the branch MTN line to UE device 110 associated with the trunk MTN line. As another example, when separating a branch MTN line from a trunk MTN line, routing provisioning manager 440 may instruct the one or more routing devices to stop routing messages associated with the branch MTN line to UE device 110 associated with the trunk MTN line.

Application servers provisioning manager 450 may provision one or more application servers. As an example, when grafting a branch MTN line to a trunk MTN line, application servers provisioning manager 450 may instruct one or more application servers, such as an application server associated with a particular application associated with a branch or trunk MTN line, to communicate with UE device 110 in connection with the branch MTN line. As another example, when separating a branch MTN line from a trunk MTN line, application servers provisioning manager 450 may instruct the one or more application servers to cease communicating with UE device 110 in connection with the branch MTN line or the trunk MTN line.

Messaging services provisioning manager 460 may provision one or more messaging services. As an example, when grafting a branch MTN line to a trunk MTN line, messaging services provisioning manager 460 may instruct a messaging server, such as an SMS server, an MMS server, a voicemail server, and/or another type of messaging server, to associate UE device 110, associated with the trunk MTN line, with the branch MTN line. Thus, messages associated with the branch MTN line may be routed to and from UE device 110. As another example, when separating a branch MTN line from a trunk MTN line, messaging services provisioning manager 460 may instruct the one or more messaging servers to cease communicating with UE device 110 in connection with the branch MTN line or the trunk MTN line.

APN provisioning manager 470 may provision one or more APNs. As an example, when grafting a branch MTN line to a trunk MTN line, APN provisioning manager 470 may add one or more APNs to an APN list stored by UE device 110. For example, the branch MTN line may be connected to a private network accessible via a particular APN. As another example, when separating a branch MTN line from a trunk MTN line, APN provisioning manager 470 may remove one or more APNs from an APN list stored by UE device 110.

Software updates provisioning manager 480 may provision one or more software update processes. As an example, when grafting a branch MTN line to a trunk MTN line, software updates provisioning manager 480 may instruct one or more software update servers, such as an OTA server, to send software updates associated with the branch MTN line to UE device 110. As another example, when separating a branch MTN line from a trunk MTN line, software updates provisioning manager 480 may instruct the one or more software updates servers to cease communicating with UE device 110 in connection with the branch MTN line or the trunk MTN line.

Although FIG. 4 shows exemplary components of provisioning system 160, in other implementations, provisioning system 160 may include fewer components, different components, additional components, or differently arranged components than depicted in FIG. 4. Additionally or alternatively, one or more components of provisioning system 160 may perform one or more tasks described as being performed by one or more other components of provisioning system 160.

Figure 5:
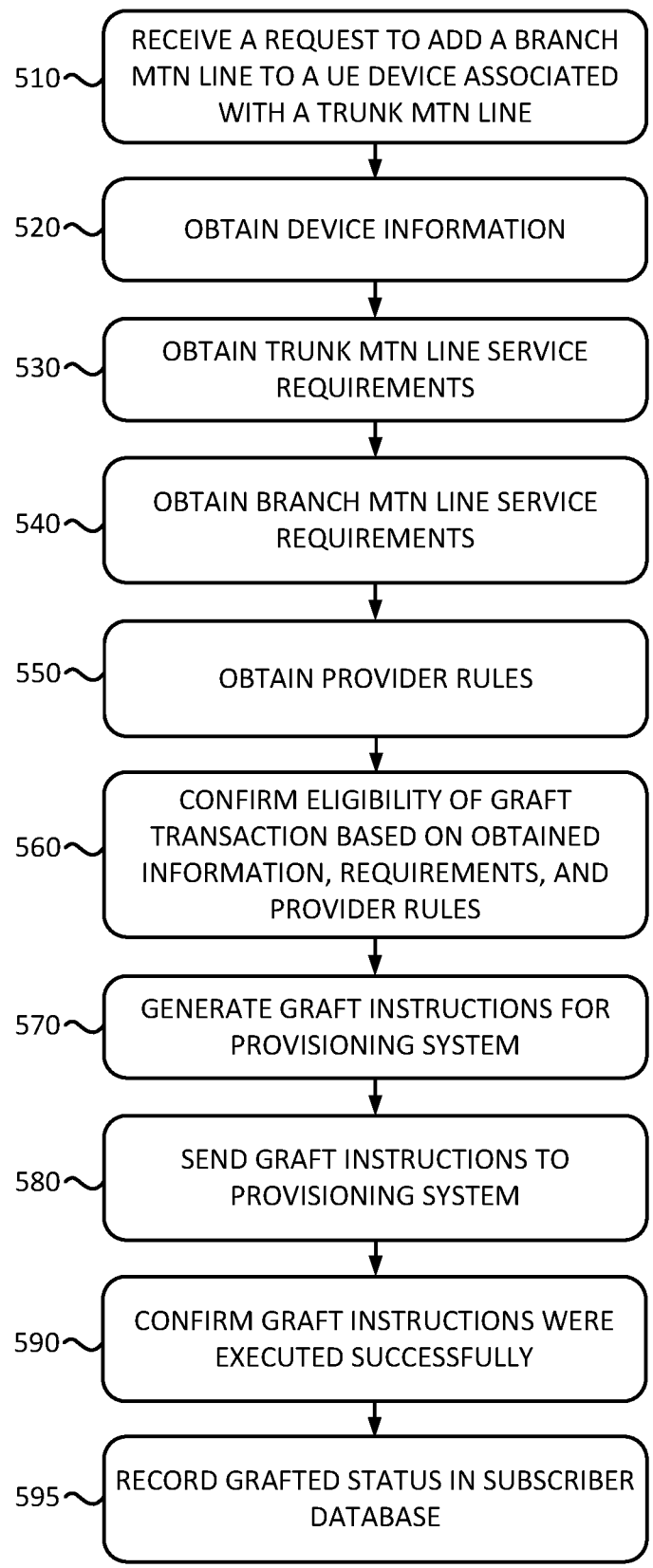
FIG. 5 is a flowchart of a process for grafting mobile telephone lines according to an implementation described herein.

FIG. 5 is a flowchart of a process for grafting mobile telephone lines according to an implementation described herein. In some implementations, the process of FIG. 5 may be performed by subscriber management system 150. In other implementations, some or all of the process of FIG. 5 may be performed by another device or a group of devices separate from subscriber management system 150.

The process of FIG. 5 may include receiving a request to add a branch MTN line to a UE device 110 associated with a trunk MTN line (block 510). For example, subscriber management system 150 may receive a request from front end system 140 to add a branch MTN line, associated with UE device 115, to UE device 110, associated with a trunk MTN line.

The process of FIG. 5 may further include obtaining device information (block 520), obtaining trunk MTN line service requirements (block 530), obtaining branch MTN line service requirements (block 540), obtaining provider rules (block 550), and confirming eligibility of a graft transaction based on the obtained UE device information, the service requirements, and the provider rules (block 560). For example, orchestration engine 320 may access subscription record 370 associated with the trunk MTN line, subscription record 370 associated with the branch MTN line, device information associated with UE device 110, and may access provider rules DB 350 to determine whether the service plans associated with the trunk MTN line, the branch MTN line, and the device type associated with UE device 110 satisfy eligibility requirements for grafting based on the provider rules stored in provider rules DB 350. If the eligibility requirements are not satisfied, the grafting process may be aborted and an error message may be sent to front end system 140. If the eligibility requirements are satisfied, processing may continue to block 570.

Graft instructions may be generated for provisioning system 160 (block 570) and the generated graft instructions may be sent to provisioning system 160 (block 580). Orchestration engine 320 may then generate graft instructions and send the graft instructions to provisioning system 160. In some implementations, the graft instructions may include an XML document. In other implementations, the graft instructions may be associated with a different format. A confirmation may be made that the graft instructions were performed successfully (block 590). For example, subscriber management system 150 may obtain a confirmation from provisioning system 160 that the graft instructions were carried out successfully. If the graft instructions were not carried out successfully, provisioning system 160 may send an error message to subscriber management system 150. In response, rollback manager 326 may perform a rollback process to restore the status of the trunk and branch MTN lines to a previous un-grafted state. Subscriber management system 150 may then perform a troubleshooting process to determine the causes of the error message and/or may attempt to perform the grafting process again.

After the confirmation of the successful execution of the graft instructions, the grafted status may then be recorded in a subscriber database (block 590). For example, orchestration engine 320 may update status field 376 in subscription record 370 of the trunk MTN line and status field 376 in subscription record 370 of the branch MTN line to indicate that the branch MTN line has been grafted to the trunk MTN line.

Figure 6:
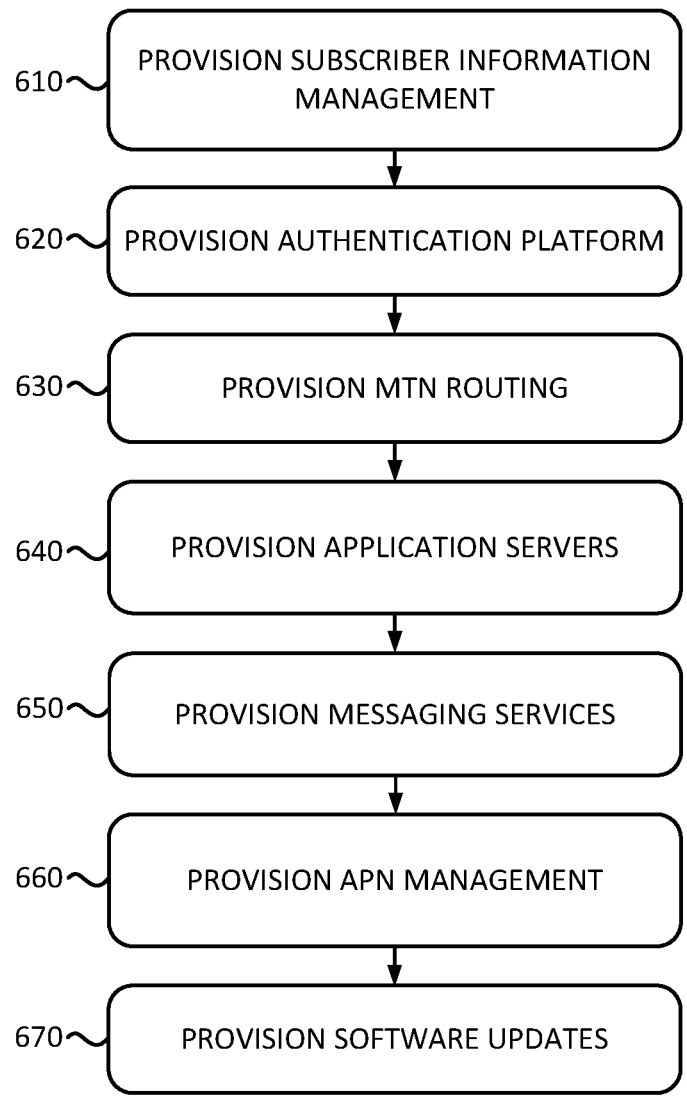
FIG. 6 is a flowchart of a process for provisioning grafted mobile telephone lines according to an implementation described herein.

FIG. 6 is a flowchart of a process for provisioning grafted mobile telephone lines/numbers according to an implementation described herein. In some implementations, the process of FIG. 6 may be performed by provisioning system 160. In other implementations, some or all of the process of FIG. 6 may be performed by another device or a group of devices separate from provisioning system 160.

The process of FIG. 6 may include provisioning subscriber information management (block 610). For example, provisioning system 160 may update an HSS profile, an IMS profile, and/or another type of subscriber profile for the trunk MTN line to add the branch MTN line to the subscriber profile. Authentication platform provisioning may be performed (block 620). For example, provisioning system 160 may add the branch MTN line to an account associated with trunk MTN line in an authentication platform server, such as an AAA server. MTN routing provisioning may be performed (block 630). For example, provisioning system 160 may instruct one or more routing devices, such as a Diameter Routing Agent (DRA) device, to route messages associated with the branch MTN line to UE device 110 associated with the trunk MTN line.

Application server provisioning may be performed (block 640). For example, provisioning system 160 may instruct one or more application servers, such as an application server associated with a particular application associated with a branch or trunk MTN line, to communicate with UE device 110 in connection with the branch MTN line. Messaging services provisioning may be performed (block 650). For example, provisioning system 160 may instruct a messaging server, such as an SMS server, an MMS server, a voicemail server, and/or another type of messaging server, to associate UE device 110, associated with the trunk MTN line, with the branch MTN line. APN management provisioning may be performed (block 660). For example, provisioning system 160 may add one or more APNs to an APN list stored by UE device 110. For example, the branch MTN line may be connected to a private network accessible via a particular APN. Software updates provisioning may be performed (block 670). For example, provisioning system 160 may instruct one or more software update servers, such as an OTA server, to send software updates associated with the branch MTN line to UE device 110.

Figure 7:
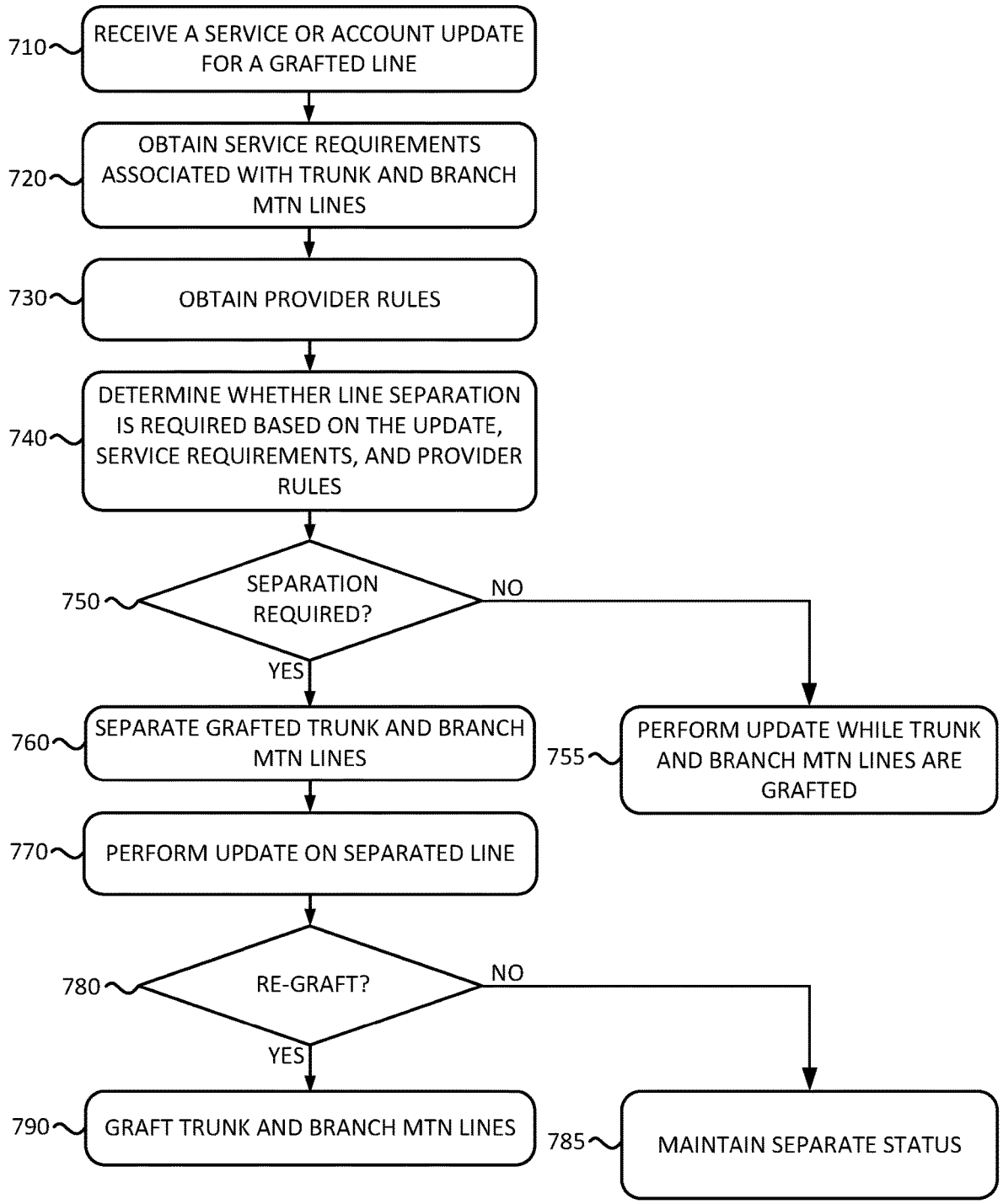
FIG. 7 is a flowchart of a process for separating mobile telephone lines according to an implementation described herein.

FIG. 7 is a flowchart of a process for separating mobile telephone lines according to an implementation described herein. In some implementations, the process of FIG. 7 may be performed by subscriber management system 150. In other implementations, some or all of the process of FIG. 7 may be performed by another device or a group of devices separate from subscriber management system 150.

The process of FIG. 7 may include receiving a service or account update for a grafted line (block 710). As an example, subscriber management system 150 may receive a request for a service or account update from front end system 140 for one of a branch MTN line or a trunk MTN line. As another example, subscriber management system 150 may receive a request from billing interface 315 to suspend an MTN line. The service or account update may include, for example, a request to add, remove, or change a service associated with an MTN line; a request to add, remove, or change a user associated with the MTN line; a request to disconnect an MTN line; a request to suspend an MTN line; a request to change an MTN associated with a subscription; and/or another type of service or account update.

The process of FIG. 7 may further include obtaining service requirements associated with the trunk and branch MTN lines (block 720), obtaining provider rules (block 730), and determining whether line separation is required based on the update, the service requirements, and the provider rules (block 740). For example, orchestration engine 320 may access subscription record 370 associated with MTN line for which the update is received and may determine that the MTN line is associated with a grafted status. Orchestration engine 320 may then access subscription records 370 associated with one or more other MTN lines grafted with the MTN line and obtain service plan information associated with each of the MTN lines. Orchestration engine 320 may access provider rules DB 350 to determine whether, based on the requested update and the obtained service plan information, separation of the grafted MTN lines is required to perform the requested update.

If it is determined that no separation is required (block 750—NO), the update may be performed while the trunk and branch MTN lines are grafted (block 755). For example, subscriber management system 150 may send an instruction to provisioning system 160 to perform the requested update. If it is determined that separation is required (block 750—YES), the grafted trunk and branch MTN lines may be separated (block 760) and the update may be performed on a separated MTN line (block 770). For example, orchestration engine 320 may generate separation instructions and send the separate instructions to provisioning system 160. In some implementations, the separation instructions may include an XML document. In other implementations, the separation instructions may be associated with a different format.

Provisioning system 160 may receive the separation instructions and may perform one or more provisioning steps based on the separation instructions. For example, provisioning system 160 may perform one or more of removing the branch MTN line from a subscription record for the trunk MTN line; removing a branch MTN line from an account associated with the trunk MTN line in an authentication platform server; instructing one or more routing devices to stop routing messages associated with the branch MTN line to UE device 110 associated with the trunk MTN line; instructing one or more application servers to cease communicating with UE device 110 in connection with the branch MTN line or the trunk MTN line; instructing one or more messaging servers to cease communicating with UE device 110 in connection with the branch MTN line or the trunk MTN line; removing one or more APNs from an APN list stored by UE device 110; instructing one or more software updates servers to cease communicating with UE device 110 in connection with the branch MTN line or the trunk MTN line; and/or performing other types of provisioning processes.

Furthermore, provisioning system 160 may, for some types of requested updates, perform additional provisioning steps. For example, for some service plans, provisioning system 160 may, when a trunk MTN line is suspended, ensure that the branch MTN line continues to function on UE device 110. Thus, provisioning system 160 may remove the branch MTN line from the subscriber profile of the trunk MTN line, may delete or inactivate the subscriber profile of the suspended trunk MTN line, and may update a subscriber profile for the branch MTN line or may generate a new subscriber profile for the branch MTN line. Thus, the branch MTN line may continue to operate on UE device 110 while the trunk MTN line is suspended.

A determination may be made as to whether to re-graft the trunk and branch MTN lines (block 780). If it is determined that no re-grafting is to be performed (block 780—NO), the separate status may be maintained (block 785). If it is determined that re-grafting is to be performed (block 780—YES), the trunk and branch MTN lines may be grafted (block 790). As an example, orchestration engine 320 may determine, based on provider rules stored in provider rules DB 350, that re-grafting may be performed after the requested update is performed. For example, after an MTN is changed for a subscription, the provider rules may specify that re-grafting may be performed. As another example, orchestration engine 320 may determine that re-grafting may be performed based on information received from front end interface 310 and/or billing interface 315. For example, billing interface 315 may receive a message that an unpaid balance for a suspended MTN line has been paid and that the suspended MTN line may be re-activated. In response, orchestration engine 320 may then generate graft instructions to re-graft the separated MTN lines and send the graft instructions to provisioning system 160.

Figure 8:
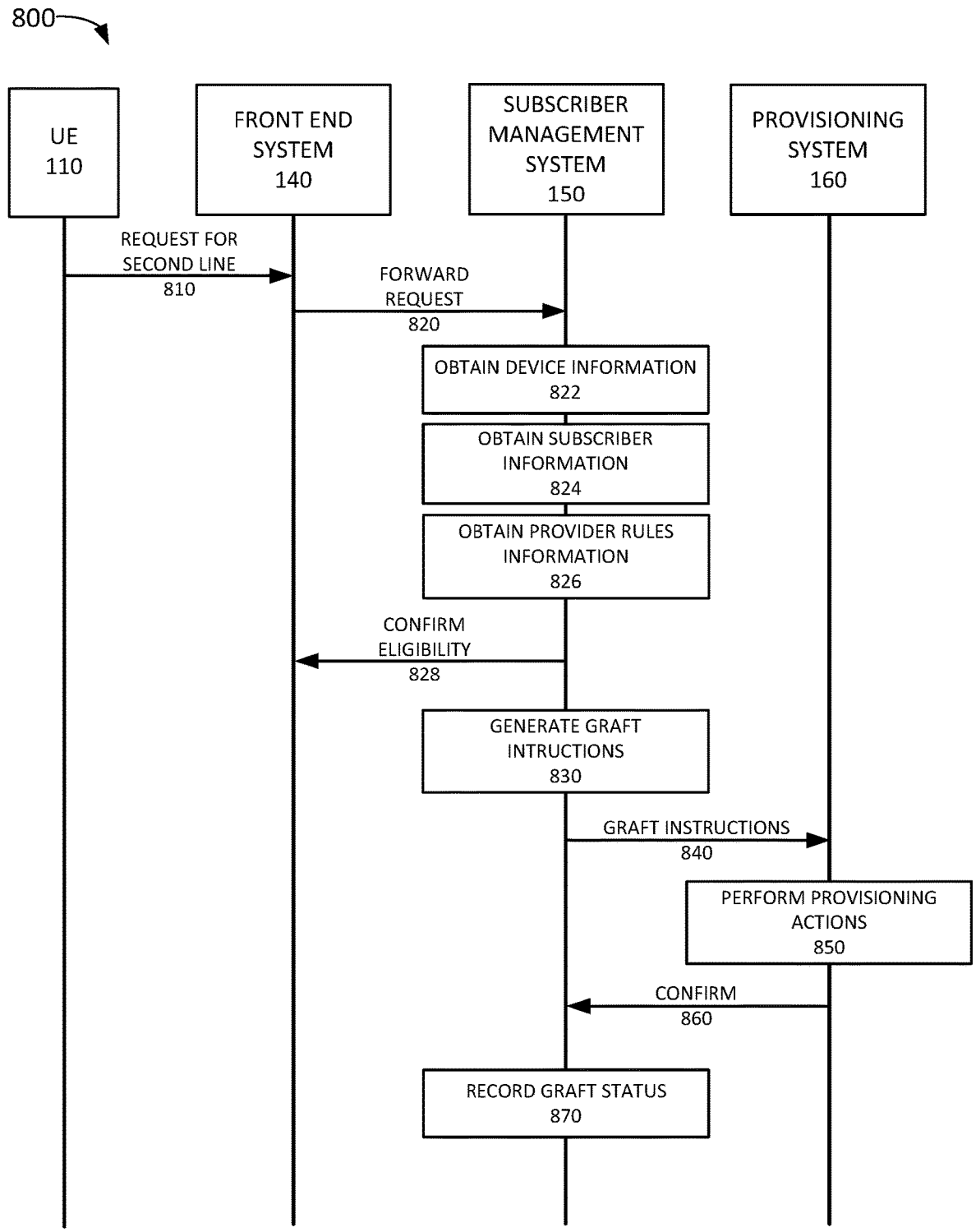
FIG. 8 is a diagram of a first exemplary signal flow according to an implementation described herein.

FIG. 8 is a diagram of a first exemplary signal flow 800 according to an implementation described herein. Signal flow 800 illustrates grafting of a branch MTN line associated with UE device 115 to a trunk MTN line associated with UE device 110, so that a user may place and receive telephone calls for both the trunk MTN line and the branch MTN line via UE device 110. Signal flow 800 may include the user of UE device 110 using UE device 110 to access front end system 140 and requesting to add a second line to UE device 110 (signal 810). For example, the user may access a web site hosted by front end system 140, log into the user's account, and request to add the branch MTN line to the trunk MTN line. Front end system 140 may forward the request to subscriber management system 150 (signal 820).

Subscriber management system 150 may obtain device information associated with UE device 110 stored in UE device DB 330 (block 822), may obtain subscriber information for the trunk MTN line and the branch MTN line stored in subscription DB 340 (block 824), and may access provider rules stored in provider rules DB 350 to determine whether the branch MTN line is eligible to be grafted to the trunk MTN line associated with UE device 110 (block 826). After eligibility is confirmed, subscriber information system 150 may provide indication of the eligibility to front end system 140 (signal 828), may generate graft instructions for provisioning system 160 (block 830). Subscriber management system 150 may send the generated graft instructions to provisioning system 160 (signal 840) and provisioning system 160 may perform one or more provisioning actions to graft the branch MTN line to the trunk MTN line and to enable UE device 110 to place and receive telephone calls using branch MTN line (block 850).

After successful provisioning, provisioning system 160 may provide confirmation to subscriber management system 150 that provisioning steps to carry out the graft instruction were performed successfully (signal 860). After the confirmation of the successful execution of the graft instructions, subscriber management system 150 may record the graft status for the trunk and branch MTN lines in subscription DB 340 (block 870).

Figure 9:
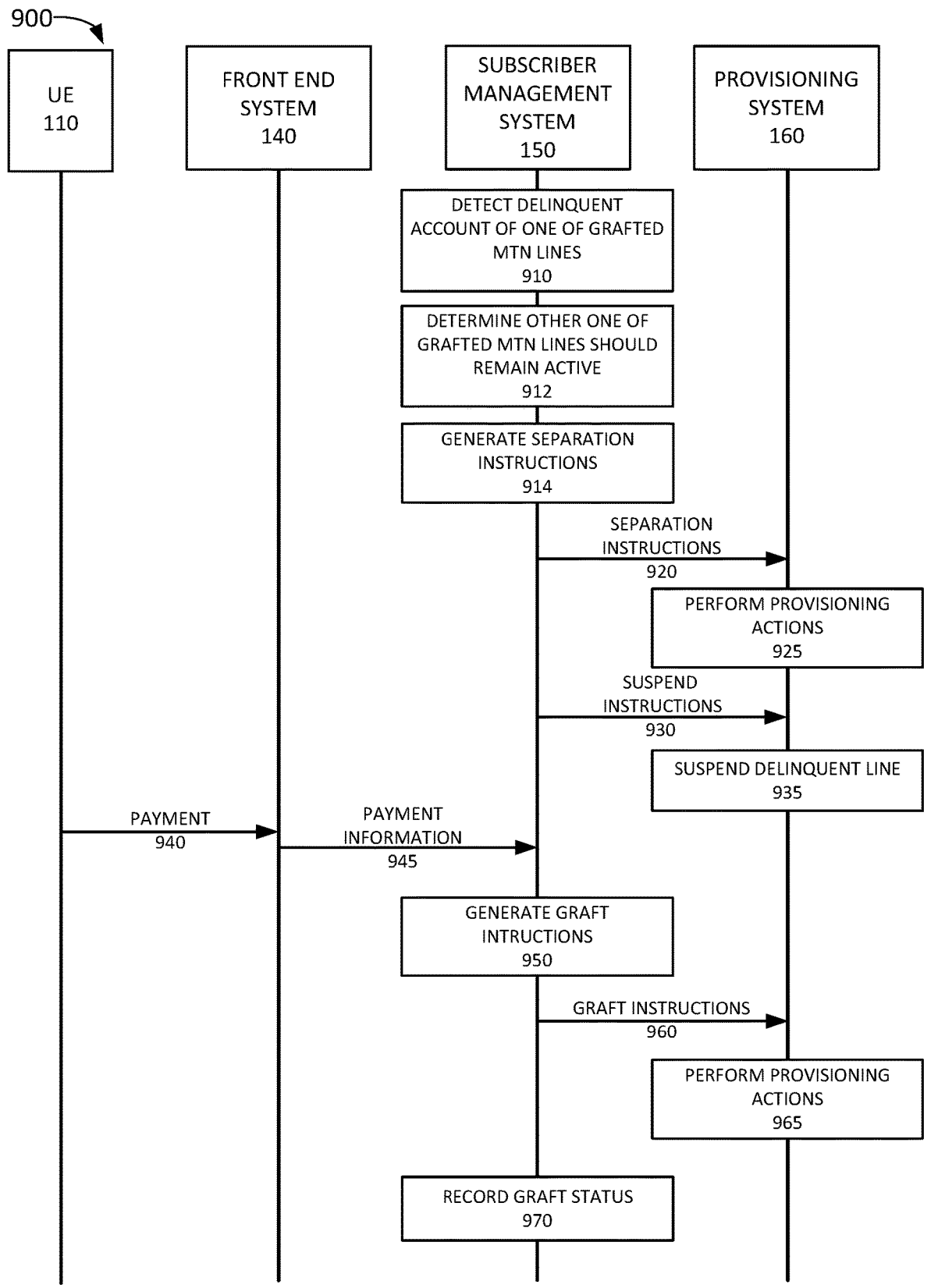
FIG. 9 is a diagram of a second exemplary signal flow according to an implementation described herein.

FIG. 9 is a diagram of a second exemplary signal flow 900 according to an implementation described herein. Signal flow 900 illustrates separation of grafted branch and trunk MTN lines and later re-grafting of the separated branch and trunk MTN lines. For example, assume that the account for the trunk MTN line associated with UE device 110, which corresponds to the user's personal mobile telephone number, is delinquent due to an unpaid balance, which prompts subscriber management system 150 to suspend the trunk MTN line. Furthermore, assume that a branch MTN line, associated with UE device 115, corresponds to the user's work telephone number and is grafted to the trunk MTN line, and is to remain active even though the trunk MTN line is suspended. Thus, signal flow 900 may include subscriber management system 150 detecting a delinquent account associated with one of grafted MTN lines (block 910), determining that the other one of the grafted MTN lines should remain active (block 912), and generating separation instructions to separate the grafted branch and trunk MTN lines (block 914).

Subscriber management system 150 may send separation instructions to provisioning system 160 (signal 920) and provisioning system 160 may separate the grafted branch and trunk MTN lines (block 925). For example, among other provisioning steps, provisioning system 160 may remove the branch MTN line from an HSS subscriber record and from an IMS subscriber record associated with the trunk MTN line. Subscriber management system 150 may further send suspend instructions to provisioning system 160 (signal 930) and provisioning system 160 may suspend the trunk MTN line while keeping the branch MTN line active on UE device 110. For example, provisioning system 160 may remove or inactivate the HSS subscriber record and the IMS subscriber record for the trunk MTN line and update an existing HSS subscriber record and/or an IMS subscriber record for the branch MTN line or may generate a new HSS subscriber record and/or a new IMS subscriber record for the branch MTN line for UE device 110.

At a later time, the user may send a payment via UE device 110 to front end system 140 (signal 940) and front end system 140 may provide information relating to the payment to subscriber management system 150 (signal 945). In response, subscriber management system 150 may determine that the trunk MTN line should be re-activated and that the branch and trunk MTN lines should be re-grafted. Thus, subscriber management system 150 may generate graft instructions for provisioning system 160 (block 950). Subscriber management system 150 may send the generated graft instructions to provisioning system 160 (signal 960) and provisioning system 160 may perform one or more provisioning actions to graft the branch MTN line to the trunk MTN line and to enable UE device 110 to place and receive telephone calls using branch MTN line (block 965). Furthermore, subscriber management system 150 may record the graft status for the trunk and branch MTN lines in subscription DB 340 (block 970).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5, 6, and 7, and a series of signal flows have been described with respect to FIGS. 8, and 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors or microprocessors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a computer device in a provider network, a request to add a second mobile telephone number (MTN) line to a user equipment (UE) device associated with a first MTN line;
   determining, by the computer device, that the second MTN line is eligible to be grafted with the first MTN line;
   generating, by the computer device, a graft instruction to graft the second MTN line to the first MTN line, wherein the graft instruction instructs a provisioning system to provision the second MTN line on the UE device, wherein the provisioning system is configured to provision subscriber information management for MTN lines by updating a subscriber profile for an MTN line, and wherein generating the graft instruction includes:
      generating an Extensible Markup Language (XML) document that includes the generated graft instruction;
   sending, by the computer device, the generated graft instruction to the provisioning system configured to provision services for the UE device; and
   designating, by the computer device, the second MTN line as having a grafted status with respect to the first MTN line, wherein the grafted status indicates that the second MTN line has been added to the subscriber profile of the first MTN line, and that the UE device is configured to send and receive communications using at least one of the first MTN line or the second MTN line.

2. The method of claim 1, wherein the subscriber profile includes at least one of a Home Subscriber Server (HSS) profile or an Internet Protocol (IP) Multimedia Subsystem (IMS) profile.

3. The method of claim 1, wherein determining that the second MTN line is eligible to be grafted with the first MTN line includes:
   obtaining device information associated with the UE device;
   obtaining service requirements associated with the first MTN line;
   obtaining service requirements associated with the second MTN line; and
   determining that the second MTN line is eligible to be grafted with the first MTN line based on comparing the obtained device information, the obtained service requirements associated with the first MTN line, and the obtained service requirements associated with the second MTN line with one or more provider rules.

4. The method of claim 1, further comprising:
   receiving a request for information associated with the first MTN line or the second MTN line from a front end system configured to process MTN service requests; and
   providing an indication of the grafted status to the front end system, in response to receiving the request for information associated with the first MTN line or the second MTN line.

5. The method of claim 1, further comprising at least one of:
   provisioning the subscriber information management based on the generated graft instruction to graft the second MTN line to the first MTN line;
   provisioning an authentication platform based on the generated graft instruction to graft the second MTN line to the first MTN line;
   provisioning MTN routing based on the generated graft instruction to graft the second MTN line to the first MTN line;
   provisioning an application server based on the generated graft instruction to graft the second MTN line to the first MTN line;
   provisioning a messaging service based on the generated graft instruction to graft the second MTN line to the first MTN line;
   provisioning an Access Point Name (APN) based on the generated graft instruction to graft the second MTN line to the first MTN line; or
   provisioning a software update based on the generated graft instruction to graft the second MTN line to the first MTN line.

6. The method of claim 1, further comprising:
   receiving a service update for at least one of the first MTN line or the second MTN line;
   determining that the service update requires separation of the grafted status of the second MTN line with respect to the first MTN line;
   generating a separation instruction to separate the second MTN line from the first MTN line; and
   sending the generated separation instruction to the provisioning system.

7. The method of claim 6, wherein the service update includes at least one of:
   a disconnect request for the first MTN line or the second MTN line;
   a suspend request for the first MTN line or the second MTN line; or
   a request to change an MTN associated with the first MTN line or the second MTN line.

8. The method of claim 6, wherein the service update includes a suspend request for the first MTN line, the method further comprising:
   suspending the subscriber profile of the first MTN line; and
   updating a subscriber profile for the second MTN line.

9. The method of claim 6, further comprising:
determining that the second MTN line is eligible to be re-grafted with the first MTN line;
generating a re-graft instruction to re-graft the second MTN line to the first MTN line; and
sending the generated re-graft instruction to the provisioning system.

10. A device comprising:
a memory configured to store instructions; and
a processor configured to execute the instructions to:
receive a request to add a second mobile telephone number (MTN) line to a user equipment (UE) device associated with a first MTN line;
determine that the second MTN line is eligible to be grafted with the first MTN line;
generate a graft instruction to graft the second MTN line to the first MTN line, wherein the graft instruction instructs a provisioning system to provision the second MTN line on the UE device, wherein the provisioning system is configured to provision subscriber information management for MTN lines by updating a subscriber profile for an MTN line, and wherein generating the graft instruction includes:
generating an Extensible Markup Language (XML) document that includes the generated graft instruction;
send the generated graft instruction to the provisioning system configured to provision services for the UE device; and
designate the second MTN line as having a grafted status with respect to the first MTN line, wherein the grafted status indicates that the second MTN line has been added to a subscriber profile of the first MTN line, and that the UE device is configured to send and receive communications using at least one of the first MTN line or the second MTN line.

11. The device of claim 10, wherein the subscriber profile includes at least one of a Home Subscriber Server (HSS) profile or an Internet Protocol (IP) Multimedia Subsystem (IMS) profile.

12. The device of claim 10, wherein, when determining that the second MTN line is eligible to be grafted with the first MTN line, the processor is further configured to:
obtain device information associated with the UE device;
obtain service requirements associated with the first MTN line;
obtain service requirements associated with the second MTN line; and
determine that the second MTN line is eligible to be grafted with the first MTN line based on comparing the obtained device information, the obtained service requirements associated with the first MTN line, and the obtained service requirements associated with the second MTN line with one or more provider rules.

13. The device of claim 10, wherein the processor is further configured to:
receive a request for information associated with the first MTN line or the second MTN line from a system configured to process MTN service requests from users or customer representatives; and
provide an indication of the grafted status to the system, in response to receiving the request for information associated with the first MTN line or the second MTN line.

14. The device of claim 10, wherein the processor is further configured to:

receive a service update for at least one of the first MTN line or the second MTN line;
determine that the service update requires separation of the grafted status of the second MTN line with respect to the first MTN line;
generate a separation instruction to separate the second MTN line from the first MTN line; and
send the generated separation instruction to the provisioning system.

15. The device of claim 14, wherein the service update includes at least one of:
a disconnect request for the first MTN line or the second MTN line;
a suspend request for the first MTN line or the second MTN line; or
a request to change an MTN associated with the first MTN line or the second MTN line.

16. The device of claim 14, wherein the processor is further configured to:
determine that the second MTN line is eligible to be re-grafted with the first MTN line;
generate a re-graft instruction to re-graft the second MTN line to the first MTN line; and
send the generated re-graft instruction to the provisioning system.

17. A method comprising:
generating, by a computer device in a provider network, a graft instruction to graft a second mobile telephone number (MTN) line to a first MTN line associated with a user equipment (UE) device, wherein the graft instruction instructs a provisioning system to provision the second MTN line on the UE device, and wherein the provisioning system is configured to provision subscriber information management for MTN lines by updating a subscriber profile for an MTN line;
sending, by the computer device, the generated graft instruction to the provisioning system configured to provision services for the UE device;
designating, by the computer device, the second MTN line as having a grafted status with respect to the first MTN line, wherein the grafted status indicates that the second MTN line has been added to a subscriber profile of the first MTN line, and that the UE device is configured to send and receive communications using at least one of the first MTN line or the second MTN line;
receiving, by the computer device, a service update for at least one of the first MTN line or the second MTN line;
determining, by the computer device, that the service update requires separation of the grafted status of the second MTN line with respect to the first MTN line;
generating, by the computer device, a separation instruction to separate the second MTN line from the first MTN line; and
sending, by the computer device, the generated separation instruction to the provisioning system.

18. The method of claim 17, further comprising at least one of:
provisioning the subscriber information management based on the generated graft instruction to graft the second MTN line to the first MTN line;
provisioning an authentication platform based on the generated graft instruction to graft the second MTN line to the first MTN line;
provisioning MTN routing based on the generated graft instruction to graft the second MTN line to the first MTN line;

provisioning an application server based on the generated graft instruction to graft the second MTN line to the first MTN line;

provisioning a messaging service based on the generated graft instruction to graft the second MTN line to the first MTN line;

provisioning an Access Point Name (APN) based on the generated graft instruction to graft the second MTN line to the first MTN line; or provisioning a software update based on the generated graft instruction to graft the second MTN line to the first MTN line.

19. The method of claim 17, wherein the service update includes at least one of:

a disconnect request for the first MTN line or the second MTN line;

a suspend request for the first MTN line or the second MTN line; or a request to change an MTN associated with the first MTN line or the second MTN line.

20. The method of claim 17, wherein the service update includes a suspend request for the first MTN line, the method further comprising:

suspending the subscriber profile of the first MTN line; and updating a subscriber profile for the second MTN line.

* * * * *